(12) United States Patent
Hatano

(10) Patent No.: US 8,226,176 B2
(45) Date of Patent: Jul. 24, 2012

(54) BRAKE SYSTEM

(75) Inventor: Kunimichi Hatano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 954 days.

(21) Appl. No.: 12/075,469

(22) Filed: Mar. 11, 2008

(65) Prior Publication Data

US 2008/0223675 A1 Sep. 18, 2008

(30) Foreign Application Priority Data

Mar. 12, 2007 (JP) ................................. 2007-062315

(51) Int. Cl.
*B60T 8/88* (2006.01)
(52) U.S. Cl. ............................... 303/122.13; 303/115.2
(58) Field of Classification Search .................. 303/2, 3, 303/9, 15, 122, 122.04, 122.05, 122.09, 122.12, 303/122.13

See application file for complete search history.

(56) References Cited

U.S. PATENT DOCUMENTS

| | | | | |
|---|---|---|---|---|
| 3,679,270 | A | * | 7/1972 | Jania ........................... 303/114.2 |
| 4,523,792 | A | * | 6/1985 | Belart et al. ................. 303/122.1 |
| 4,653,815 | A | | 3/1987 | Agarwal et al. |
| 5,302,008 | A | | 4/1994 | Miyake et al. |
| 5,613,740 | A | * | 3/1997 | Kawamoto et al. ............. 303/11 |
| 5,713,640 | A | * | 2/1998 | Feigel et al. ................. 303/115.2 |
| 5,836,659 | A | * | 11/1998 | Feigel et al. ................. 303/115.2 |
| 5,887,954 | A | * | 3/1999 | Steiner et al. ............... 303/113.4 |
| 6,007,161 | A | * | 12/1999 | Worsdorfer ................ 303/115.2 |
| 6,033,036 | A | * | 3/2000 | Ruffer et al. ............... 303/114.1 |
| 6,099,087 | A | * | 8/2000 | Mortimer et al. .......... 303/115.2 |
| 6,135,575 | A | * | 10/2000 | Feigel et al. ............... 303/113.4 |
| 6,315,370 | B1 | * | 11/2001 | Feigel et al. ............... 303/115.2 |
| 6,604,795 | B2 | * | 8/2003 | Isono et al. ..................... 303/11 |
| 6,742,850 | B1 | | 6/2004 | Eckert et al. |
| 6,899,403 | B2 | | 5/2005 | Isono et al. |
| 2001/0006306 | A1 | * | 7/2001 | Kagawa et al. ................. 303/20 |
| 2002/0125764 | A1 | | 9/2002 | Sakamoto |
| 2002/0140285 | A1 | | 10/2002 | Baumgartner et al. |

FOREIGN PATENT DOCUMENTS

| | | |
|---|---|---|
| EP | 1 219 516 A2 | 7/2002 |
| EP | 1 219 516 A3 | 7/2002 |

(Continued)

OTHER PUBLICATIONS

English-language machine translation of JP 2003-034244.*

*Primary Examiner* — Bradley King
*Assistant Examiner* — Nicholas J Lane
(74) *Attorney, Agent, or Firm* — Carrier Blackman & Associates, P.C.; William D. Blackman; Joseph P. Carrier

(57) ABSTRACT

A brake system includes a master cylinder which generates brake fluid pressure by a braking operation of a driver, an electric motor-driven slave cylinder which generates brake fluid pressure based on an electric signal responsive to a braking operation of a driver, and a wheel cylinder for braking a wheel by the brake fluid generated in the master cylinder or slave cylinder. During normal operation of the brake system, the brake fluid generated in the slave cylinder is transferred to the wheel cylinder. During abnormal operation of the brake system, the brake fluid generated in the master cylinder is transferred to the wheel cylinder. The brake system also includes an opening and closing valve in a fluid passage connecting the slave cylinder to the wheel cylinder. When a problem occurs with the slave cylinder, the opening and closing valve is closed for a predetermined amount of time.

20 Claims, 6 Drawing Sheets

FOREIGN PATENT DOCUMENTS

| | | |
|---|---|---|
| EP | 1 674 360 A2 | 6/2006 |
| EP | 1 674 360 A3 | 6/2006 |
| JP | 2000-185641 A | 7/2000 |
| JP | 2003-034244 A | 2/2003 |
| JP | 2005-119424 A | 5/2005 |
| JP | 2005-343366 | 12/2005 |

\* cited by examiner

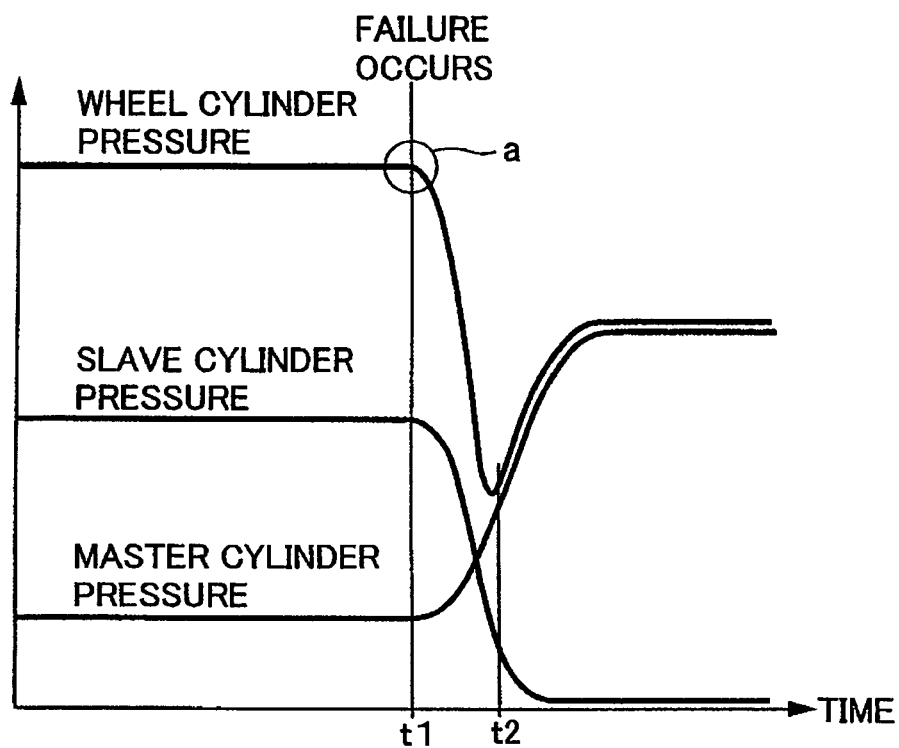
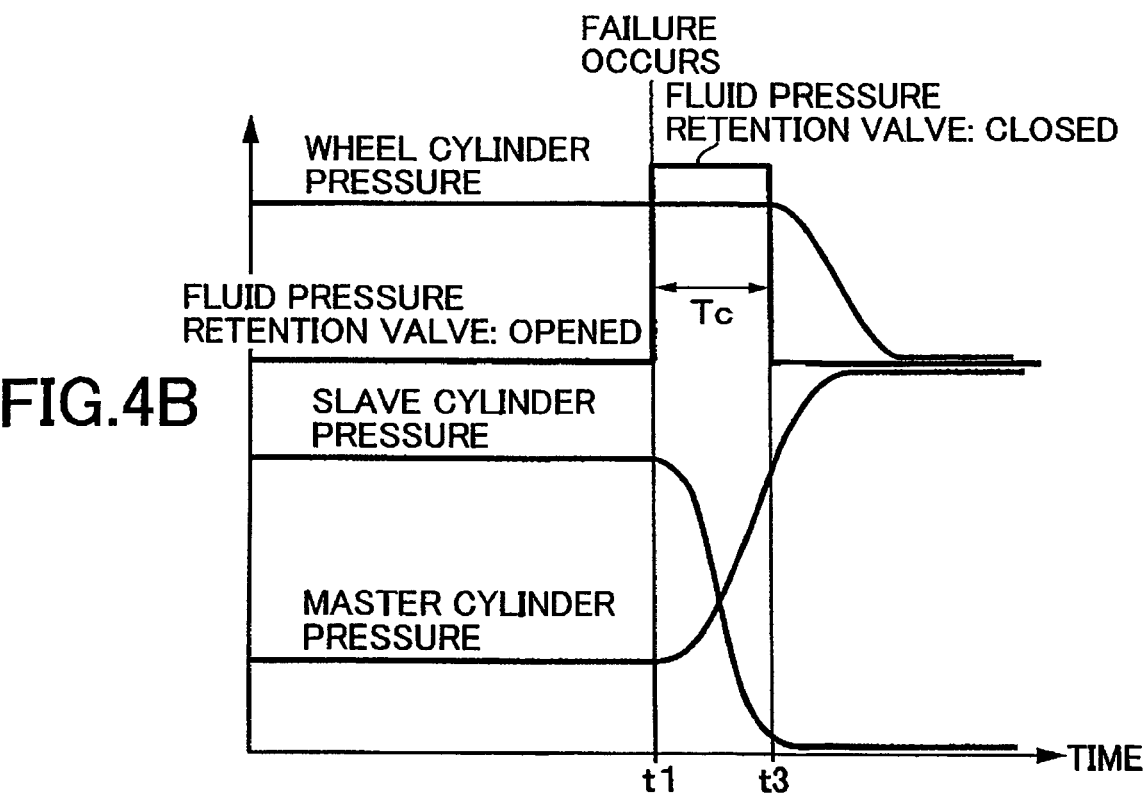

BRAKE SYSTEM

CROSS-REFERENCE TO RELATED APPLICATIONS

The present invention claims priority under 35 USC §119 based on Japanese patent application No. 2007-62315 filed 12 Mar. 2007. The subject matter of this priority document is incorporated by reference herein.

BACKGROUND OF THE INVENTION

1. Field of the Invention

The present invention relates to a brake system comprising a master cylinder that generates brake fluid pressure by a braking operation of a driver, and a slave cylinder that generates brake fluid pressure by a driving force of an electric motor that operates according to an electrical signal which is responsive to the braking operation by the driver.

2. Description of the Related Art

Japanese Patent Application Laid-open No. 2005-343366 discloses a brake system of the type referred to as a brake by wire (BBW) brake system, which converts a braking operation of a driver into an electrical signal used to operate an electric brake force generator or generating means, such as a motor cylinder, and operates a wheel cylinder by brake fluid pressure generated by the motor cylinder.

If a problem occurs that renders the electric motor inoperative when an electric brake force generator (slave cylinder) of the BBW brake system is generating brake fluid pressure to operate a wheel cylinder, a failsafe or failure backup process for braking is performed by supplying brake fluid pressure generated by a master cylinder to the wheel cylinder via the slave cylinder.

However, at the moment when the slave cylinder becomes unable to generate a driving force for pushing a piston, the piston is pushed back by brake fluid pressure within the wheel cylinder. Therefore, there is a problem that the brake fluid pressure within the wheel cylinder suddenly decreases until the brake fluid pressure supplied from the master cylinder is built up.

SUMMARY OF THE INVENTION

The present invention has been made in view of the above circumstances, and it is an object thereof to prevent a sudden decrease in brake fluid pressure of a wheel cylinder when a slave cylinder fails during braking due to a problem that renders the slave cylinder inoperable.

To achieve the above object, according to a first aspect of the present invention, there is provided a brake system comprising: a master cylinder that generates brake fluid pressure by a braking operation of a driver; an electric motor-driven slave cylinder that generates brake fluid pressure according to an electrical signal which is based on the braking operation of the driver; a wheel cylinder that brakes a wheel by the brake fluid pressure of the master cylinder or the slave cylinder; the brake fluid pressure of the slave cylinder being transmitted to the wheel cylinder when the slave cylinder operates normally, and the brake fluid pressure of the master cylinder being transmitted to the wheel cylinder through the slave cylinder when the slave cylinder does not operate normally; and an opening and closing valve that opens and closes a fluid passage which connects the slave cylinder to the wheel cylinder, wherein the opening and closing valve is closed for a predetermined time when a problem occurs with the slave cylinder during braking.

With the first aspect of the present invention, if a problem occurs with the slave cylinder (e.g., it fails) when the wheel cylinder is being operated by the brake fluid pressure generated by the slave cylinder in a normal operation, the brake fluid pressure of the wheel cylinder is maintained for a predetermined time by closing the opening and closing valve provided in the fluid passage which connects the slave cylinder to the wheel cylinder. Therefore, during this predetermined time, it is possible to cause the master cylinder to build up sufficient brake fluid pressure for a backup process. Thus, a sudden decrease in the brake fluid pressure of the wheel cylinder can be prevented when braking by the slave cylinder is switched to braking by the master cylinder.

According to a second aspect of the present invention, in addition to the first aspect, the predetermined time is a time period required for the brake fluid pressure generated by the master cylinder to rise to a predetermined value or higher.

With the second aspect of the present invention, the predetermined time is set to be a time period required for the brake fluid pressure generated by the master cylinder to rise to the predetermined value or higher. Therefore, when the opening and closing valve, which has been closed in order to maintain the brake fluid pressure of the wheel cylinder, opens again, the master cylinder has a sufficiently increased brake fluid pressure. Thus, it is possible to reliably prevent a decrease in the brake fluid pressure of the wheel cylinder.

According to a third aspect of the present invention, in addition to the first or second aspect, the brake system further comprises a first fluid pressure sensor for detecting brake fluid pressure generated by the master cylinder, and a second fluid pressure sensor for detecting brake fluid pressure generated by the slave cylinder, wherein the slave cylinder generates brake fluid pressure so that the brake fluid pressure detected by the second fluid pressure sensor is adjusted to a level corresponding to the brake fluid pressure detected by the first fluid pressure sensor.

With the third aspect of the present invention, when braking is performed by the brake fluid pressure generated by the slave cylinder that operates according to an electrical signal which is responsive to the braking operation of the driver, the first fluid pressure sensor detects the brake fluid pressure generated by the master cylinder, the second fluid sensor detects the brake fluid pressure generated by the slave cylinder, and the slave cylinder generates brake fluid pressure so that the brake fluid pressure detected by the second fluid pressure sensor is adjusted to a level corresponding to the brake fluid pressure detected by the first fluid pressure sensor. Therefore, it is possible to cause the slave cylinder to generate brake fluid pressure corresponding to the operational amount of the master cylinder, thereby providing a braking force which the driver requires.

According to a fourth aspect of the present invention, in addition to the first or second aspect, the brake system further comprises a stroke simulator connected to the master cylinder through a reaction force permission valve, wherein the stroke simulator absorbs the brake fluid pressure generated by the master cylinder by opening the reaction force permission valve when the slave cylinder operates normally; and the brake fluid pressure generated by the master cylinder is supplied to the wheel cylinder by closing the reaction force permission valve when the slave cylinder does not operate normally.

With the fourth aspect of the present invention, the stroke simulator is connected to the master cylinder through the reaction force permission valve, and the brake fluid pressure generated by the master cylinder is absorbed by the stroke simulator when the reaction force permission valve is opened under normal operation of the slave cylinder. Therefore, it is possible to provide a pedal feeling equivalent to that provided by the brake fluid pressure generated by the master cylinder, thereby eliminating an uncomfortable feeling to the driver. Further, because the brake fluid pressure generated by the master cylinder is supplied to the wheel cylinder without being absorbed by the stroke simulator when the reaction force permission valve is closed when the slave cylinder does not operate normally, it is possible to perform braking by the brake fluid pressure generated by the master cylinder without any problem even when the slave cylinder becomes inoperative.

Fluid pressure retention valves 31A, 31B and regulator valves 61 of exemplary embodiments of the invention disclosed herein correspond to the opening and closing valves of the present invention.

The above-mentioned object, other objects, characteristics, and advantages of the present invention will become apparent from the preferred embodiments, which will be described in detail below with reference to the attached drawings.

BRIEF DESCRIPTION OF THE DRAWINGS

FIGS. 1 to 4B show a first exemplary embodiment of the present invention wherein FIG. 1 is a fluid pressure circuit diagram of a vehicle brake system under normal operating conditions;

FIG. 2 is a fluid pressure circuit diagram corresponding to FIG. 1 under abnormal operating conditions;

FIG. 3 is a flowchart for explaining operation when the slave cylinder is not operating normally, e.g., when it fails;

FIG. 4A is a time chart for explaining operation of a conventional brake system when the slave cylinder has failed (prior art); and FIG. 4B is a time chart for explaining operation of the embodiment of FIG. 1 when the slave cylinder has failed.

FIGS. 5 and 6 show a second exemplary embodiment of the present invention wherein FIG. 5 is a fluid pressure circuit diagram of a vehicle brake system under normal operating conditions; and FIG. 6 is a fluid pressure circuit diagram corresponding to FIG. 5 under abnormal operating conditions.

DESCRIPTION OF THE PRESENT EMBODIMENTS

A first exemplary embodiment of the present invention will be described with reference to FIGS. 1 to 4B.

Figure 1:
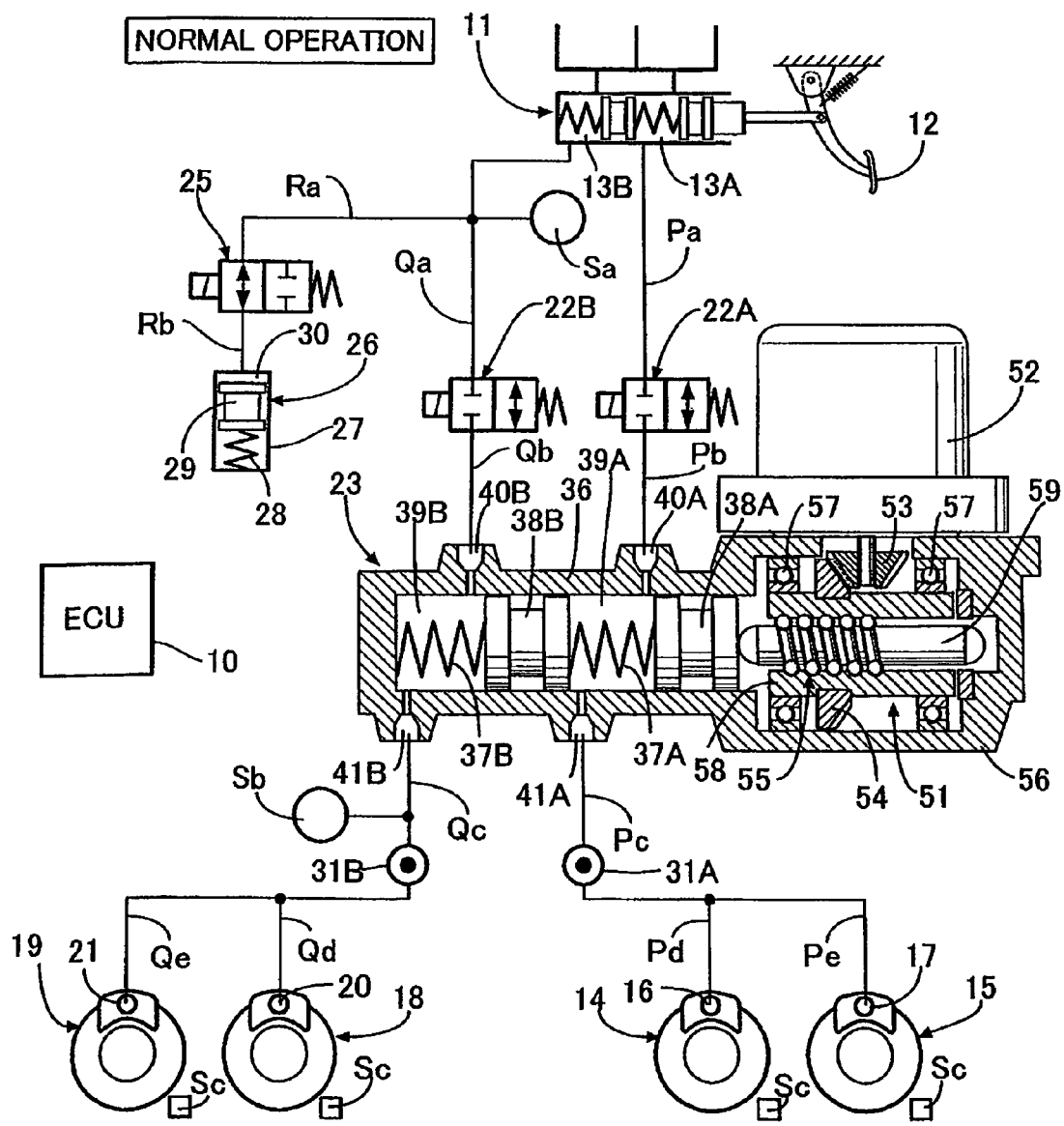

As shown in FIG. 1, a tandem master cylinder 11 has two first fluid pressure chambers 13A and 13B which output brake fluid pressure according to a pushing force applied to a brake pedal 12 by a driver depressing the brake pedal 12. One of the first fluid pressure chamber 13A is connected to wheel cylinders 16 and 17 of disc brake devices 14 and 15 for braking, for example, a left front wheel and a right rear wheel, through fluid passages Pa, Pb, Pc, Pd, and Pe. The first fluid pressure chamber 13B is connected to wheel cylinders 20 and 21 of disc brake devices 18 and 19 for braking, for example, a right front wheel and a left rear wheel, through fluid passages Qa, Qb, Qc, Qd, and Qe.

A shutoff valve 22A, which is a normally open solenoid valve, is provided between the fluid passages Pa and Pb. A shutoff valve 22B, which is a normally open solenoid valve, is provided between the fluid passages Qa and Qb. A slave cylinder 23 is provided between the fluid passages Pb, Qb and the fluid passages Pc, Qc.

A reaction force permission valve 25, which is a normally closed solenoid valve, is connected between a fluid passage Ra branching from the fluid passage Qa and a fluid passage Rb. A stroke simulator 26 is connected to the fluid passages Ra and Rb via the reaction force permission valve 25. The stroke simulator 26 has a cylinder 27 and a piston 29 slidably fitted in the cylinder 27 while being urged by a spring 28. A fluid chamber 30, formed on the side of the piston 29 opposite from the spring 28, communicates with the fluid passage Rb.

An actuator 51 of the slave cylinder 23 has a drive bevel gear 53 provided on the rotating shaft of an electric motor 52, a follower bevel gear 54 meshing with the drive bevel gear 53, and a ball screw mechanism 55 operated by the follower bevel gear 54. A sleeve 58 is rotatably supported in an actuator housing 56 via a pair of ball bearings 57. An output shaft 59 is coaxially arranged on an inner periphery of the sleeve 58. The follower bevel gear 54 is arranged on an outer periphery of the sleeve 58.

A pair of pistons 38A and 38B urged in a retreat direction by a pair of return springs 37A and 37B are slidably disposed in a cylinder body 36 of the slave cylinder 23. A pair of second fluid pressure chambers 39A and 39B are defined on the front faces of the pistons 38A and 38B, respectively. A front end of the output shaft 59 abuts on a rear end of the rear piston 38A. One of the second fluid pressure chamber 39A communicates with the fluid passages Pb, Pc via ports 40A, 41A, while the other second fluid pressure chamber 39B communicates with the fluid passages Qb, Qc through ports 40B, 41B.

Further, a fluid pressure retention valve 31A, which is a normally open solenoid valve, is arranged between the fluid passage Pc and the fluid passages Pd and Pe, and a fluid pressure retention valve 31B, which is a normally open solenoid valve, is arranged between the fluid passage Qc and the fluid passages Qd and Qe.

The operation of the first exemplary embodiment of the present invention having the above-described arrangement will now be described.

When the system is operating under normal conditions, the shutoff valves 22A and 22B, comprising normally open solenoid valves, are magnetized so as to be in a closed state; the reaction force permission valve 25, comprising a normally closed solenoid valve, is magnetized so as to be in an open state; and the fluid pressure retention valves 31A and 31B, comprising normally open solenoid valves, are demagnetized so as to be in an open state. In this state, when the fluid pressure sensor Sa provided in the fluid passage Qa detects a pushing force on the brake pedal 12 by the driver, the actuator 51 of the slave cylinder 23 is operated. That is, when the electric motor 52 is driven in one direction, the output shaft 59 is advanced by the drive bevel gear 53, the follower bevel gear 54 and the ball screw mechanism 55, so that the pair of the pistons 38A and 38B urged by the output shaft 59 are advanced. Because the ports 40A and 40B leading to the fluid passages Pb and Qb are closed quickly after the pistons 38A and 38B begin to advance, a brake fluid pressure is generated in the second fluid pressure chambers 39A and 39B. This brake fluid pressure is transmitted to the wheel cylinders 16, 17, 20 and 21 of the disc brake devices 14, 15, 18 and 19, respectively, through the fluid pressure retention valves 31A and 31B in an opened state, thereby braking the vehicle wheels.

At this time, the brake fluid pressure generated in the first fluid pressure chamber 13B of the master cylinder 11 is transmitted to the fluid chamber 30 of the stroke simulator 26 through the opened reaction force permission valve 25 to move the piston 29 against the spring 28, thereby generating a pseudo pedal reaction force while permitting the stroke of the brake pedal 12 in order to eliminate an uncomfortable feeling to the driver.

The operation of the actuator 51 for the slave cylinder 23 is controlled so that the brake fluid pressure generated by the slave cylinder 23 and detected by the fluid pressure sensor Sb provided in the fluid passage Qc has a value corresponding to the brake fluid pressure generated by the master cylinder 11 and detected by the fluid pressure sensor Sa provided in the fluid passage Qa, thereby generating the braking force in the disc brake devices 14, 15, 18 and 19 according to the pushing force applied to the brake pedal 12 by the driver.

If the slave cylinder 23 becomes inoperative due to power failure or other problem that renders the slave cylinder inoperable, the braking control is performed using the brake fluid pressure generated by the master cylinder 11 in place of the brake fluid pressure generated by the slave cylinder 23.

Figure 2:
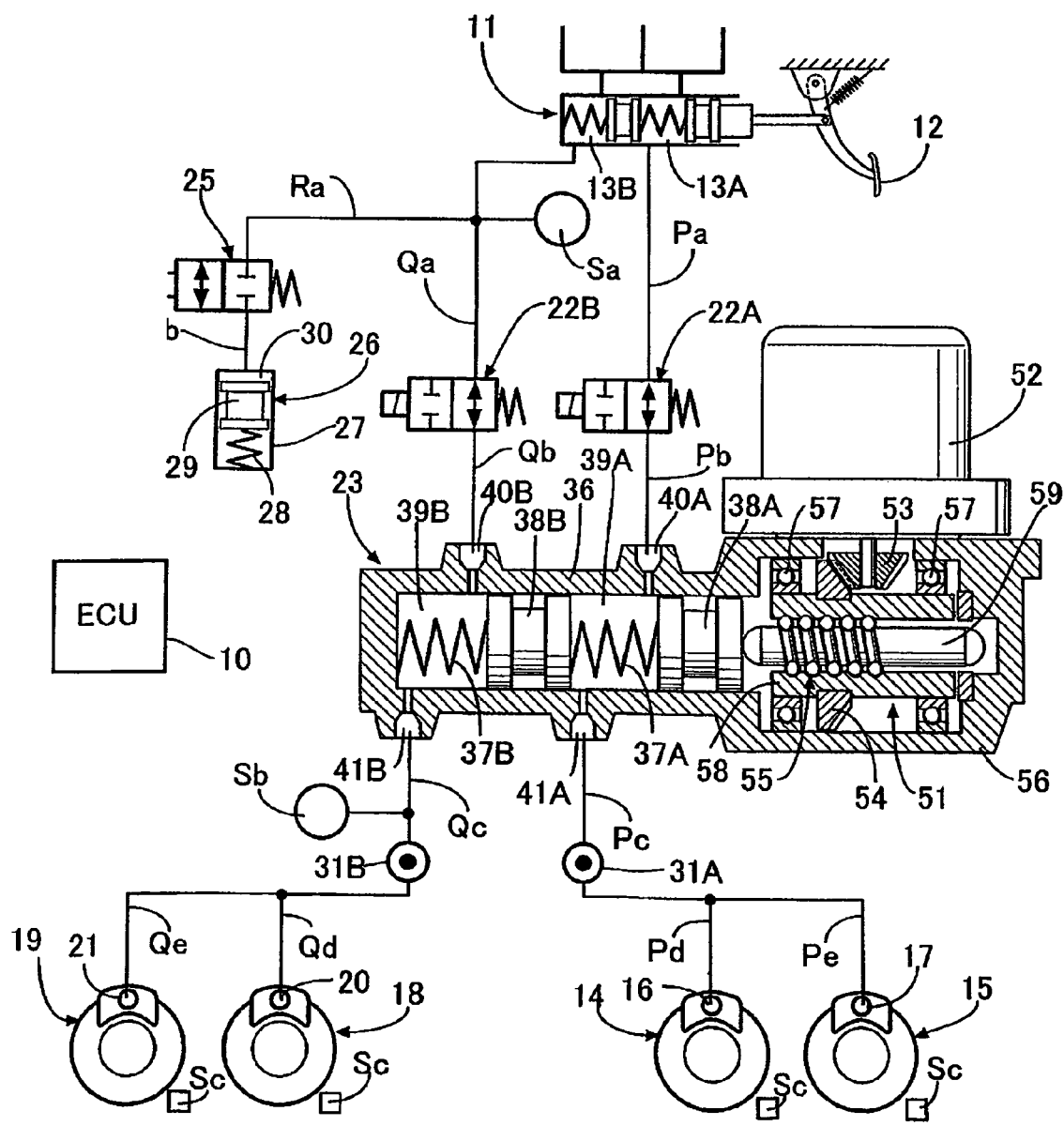

That is, in the event of power failure or other problem, as shown in FIG. 2, the shutoff valves 22A and 22B, comprising normally open solenoid valves, remain open; the reaction force permission valve 25, comprising a normally closed solenoid valve, is automatically closed; and the fluid pressure retention valves 31A and 31B, comprising normally open solenoid valves, are automatically opened. In this state, the brake fluid pressure generated in the first fluid pressure chambers 13A and 13B of the master cylinder 11 passes the shutoff valves 22A and 22B, the second fluid pressure chambers 39A and 39B of the slave cylinder 23 and the fluid pressure retention valves 31A and 31B, without being absorbed by the stroke simulator 26, and operates the wheel cylinders 16, 17, 20 and 21 of the disc brake devices 14, 15, 18 and 19, respectively, for braking the vehicle wheels, thus generating the braking force without any problem.

Figure 3:
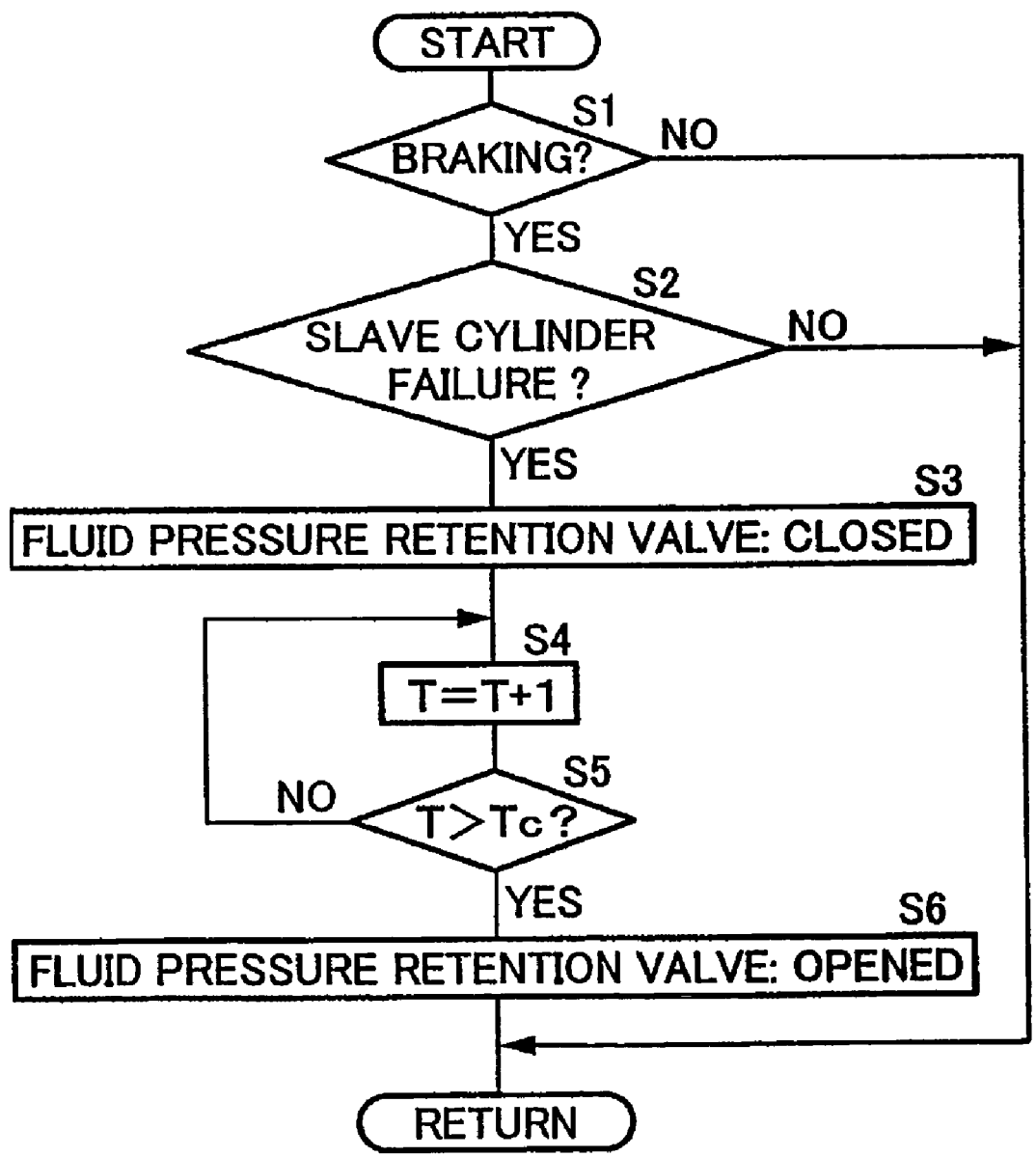

Next, the control of the fluid pressure retention valves 31A, 31B when a problem occurs with the slave cylinder 23 during braking, e.g., it fails, will be described with reference to the flowchart of FIG. 3. Control is achieved by an electronic control unit 10 (ECU) configured to effect the operations shown in FIG. 3.

First, when braking is being performed at Step S1, if the slave cylinder 23 fails at Step S2, the fluid pressure retention valves 31A, 31B are magnetized to be closed at Step S3. At Step S4 a timer T is incremented by 1, and if at Step S5 the timer T exceeds a predetermined time Tc that has been preset, the fluid pressure retention valves 31A, 31B are demagnetized to be opened at Step S6.

Specifically, if a problem occurs with the slave cylinder 23 during braking (during the operation of the slave cylinder 23), the fluid pressure retention valves 31A, 31B are closed from that point of time until a predetermined time Tc elapses. The predetermined time Tc is set beforehand as a time period which elapses until the brake fluid pressure generated by the master cylinder 11 (the fluid pressure of the fluid passage Qa detected by the fluid pressure sensor Sa) increases to a predetermined value or more.

FIG. 4A shows a flowchart in the case of a conventional device without the fluid pressure retention valves 31A, 31B. When the slave cylinder 23 fails at a time t1, the pistons 38A, 38B of the slave cylinder 23 are pushed back by the wheel cylinder pressure and they stroke backward, resulting in a sudden decrease in the wheel cylinder pressure. Also, with this failure, the master cylinder pressure generated by the master cylinder 11, which is operated by the brake pedal 12, is increased, and the increased master cylinder pressure is transmitted to the wheel cylinders 16, 17, 20 and 21. Therefore, the wheel cylinder pressure becomes equal to the master cylinder pressure at a time t2, and thereafter the wheel cylinder pressure increases with the increase in master cylinder pressure.

In the conventional device shown in FIG. 4A, the wheel cylinder pressure suddenly decreases at a region indicated by a, resulting in a problem that the braking force of the wheel cylinders 16, 17, 20 and 21 suddenly decreases at this region a.

In contrast, in the present exemplary embodiment shown in FIG. 4B, even when the slave cylinder 23 fails at the time t1, the fluid pressure retention valves 31A, 31B are closed during a predetermined time Tc from the time t1 to a time t3, thereby maintaining the wheel cylinder pressure at its initial value without decreasing. When the fluid pressure retention valves 31A, 31B are opened at the time t3, the wheel cylinder pressure begins to decrease. However, because the master cylinder pressure has already risen sufficiently by that time, the wheel cylinder pressure is maintained at the level of the master cylinder pressure without greatly decreasing, thereby avoiding a sudden decrease in the braking force of the wheel cylinders 16, 17, 20 and 21.

Next, the second exemplary embodiment of the present invention will be described with reference to FIGS. 5 and 6.

The second exemplary embodiment is established by adding an anti-lock brake system (ABS) 24, for suppressing the locking of the wheels, to the brake system of the first embodiment. This ABS 24 also has the function of vehicle stability assistance (VSA) for increasing the operational stability of the vehicle by generating a difference in braking force between the right and left wheels.

In addition, the second exemplary embodiment has no fluid pressure retention valves such as the fluid pressure retention valves 31A, 31B of the brake according to the first exemplary embodiment, and their function is provided instead by regulator valves 61, 61, which will be described later.

The structure of the ABS 24 arranged between the fluid passages Pc, Qc and the fluid passages Pd, Pe; Qd, Qe is already known. The ABS 24 has the same structure in a system including the disk brakes 14, 15 for the left front wheel and the right rear wheel, and a system including the disk brakes 18, 19 for the right front wheel and the left rear wheel. The structure of the system including the disk brakes 14, 15 for the left front wheel and the right rear wheel will be described as a representative. In-valves 42, 42 comprising a pair of normally open solenoid valves are arranged between the fluid passage Pc and the fluid passages Pd, Pe. Out-valves 44, 44 comprising a pair of normally closed solenoid valves are arranged between the fluid passages Pd, Pe downstream of the in-valves 42, 42 and the reservoir 43. Fluid pressure pumps 47, each sandwiched between a pair of check valves 45, 46, are arranged between the reservoirs 43 and the fluid passages Pc, Qc. The fluid pressure pumps 47 are driven by an electric motor 48.

In order to exert the VSA function, the ABS 24 also has the following components: the regulator valves 61, 61 comprising normally open solenoid valves, whose opening can be arbitrarily controlled, are respectively arranged before a position where the fluid passage Pc branches into the fluid passages Pd, Pe, and before a position where the fluid passage Qc branches into the fluid passages Qd, Qe. Check valves 62, 62 are arranged in series with respect to the check valves 45, 45. Suction valves 63, 63 comprising normally closed solenoid valves are arranged in the fluid passages Pf, Qf which branch from a position between the check valves 45, 45 and the check valves 62, 62 and leads to the liquid passages Pc, Qc upstream of the regulator valves 61, 61.

The operation of the brake system of the second exemplary embodiment under normal conditions is the same as the operation of the brake system of the first embodiment, because the regulator valves 61, 61 and the in-valves 42 are opened and the slave cylinder 23 and the wheel cylinders 16, 17; 20, 21 communicate with each other.

The operation during the ABS control will now be described. If slip ratio of any vehicle wheel is increased and a tendency of locking is detected based on the output from the wheel speed sensor Sc corresponding to a vehicle wheel during braking under normal conditions, the ABS 24 is operated in a state in which the slave cylinder 23 is maintained in the operating state, thereby preventing locking of the vehicle wheel.

That is, when any vehicle wheel has a tendency of locking, a pressure reducing operation is performed to release the brake fluid pressure in the wheel cylinder by opening the out-valve 44 to the reservoir 43 such that the transmission of the brake fluid pressure from the slave cylinder 23 is shut off by closing the in-valve 42 communicating with the wheel cylinder; and a pressure maintaining operation is subsequently performed to maintain the brake fluid pressure in the wheel cylinder by closing the out-valve 44, thereby reducing the braking force to avoid locking of the vehicle wheel.

When the vehicle wheel speed is recovered to reduce the slip ratio, a pressure increasing operation is performed to increase the brake fluid pressure in the wheel cylinder by opening the in-valve 42, thereby increasing the braking force for braking the vehicle wheel. The above-described pressure reducing, maintaining and increasing operation is repeatedly performed each time it is detected that the vehicle wheel has a tendency of locking. The operation is repeatedly performed to generate the maximum braking force while preventing locking of the vehicle wheels. The brake fluid flowing into the reservoir 43 during this process is returned by the fluid pressure pump 47 to the fluid passages Pc and Qc on the upstream side.

During the above-described ABS control, the shutoff valves 22A and 22B are magnetized so as to be closed, thereby preventing a fluid pressure fluctuation associated with the operation of the ABS 24 from being transmitted as a kickback from the master cylinder 11 to the brake pedal 12.

Next, the operation during the VSA control will be described. In the VSA control, the braking force can be controlled individually for the right wheels and the left wheels such that a yaw moment for suppressing over-steering is generated by operating the wheel cylinders of the turning outer wheels when an over-steering tendency occurs during the turning of the vehicle, and a yaw moment for suppressing under-steering is generated by operating the wheel cylinders of the turning inner wheels when the under-steering tendency occurs during the turning of the vehicle.

Figure 5:
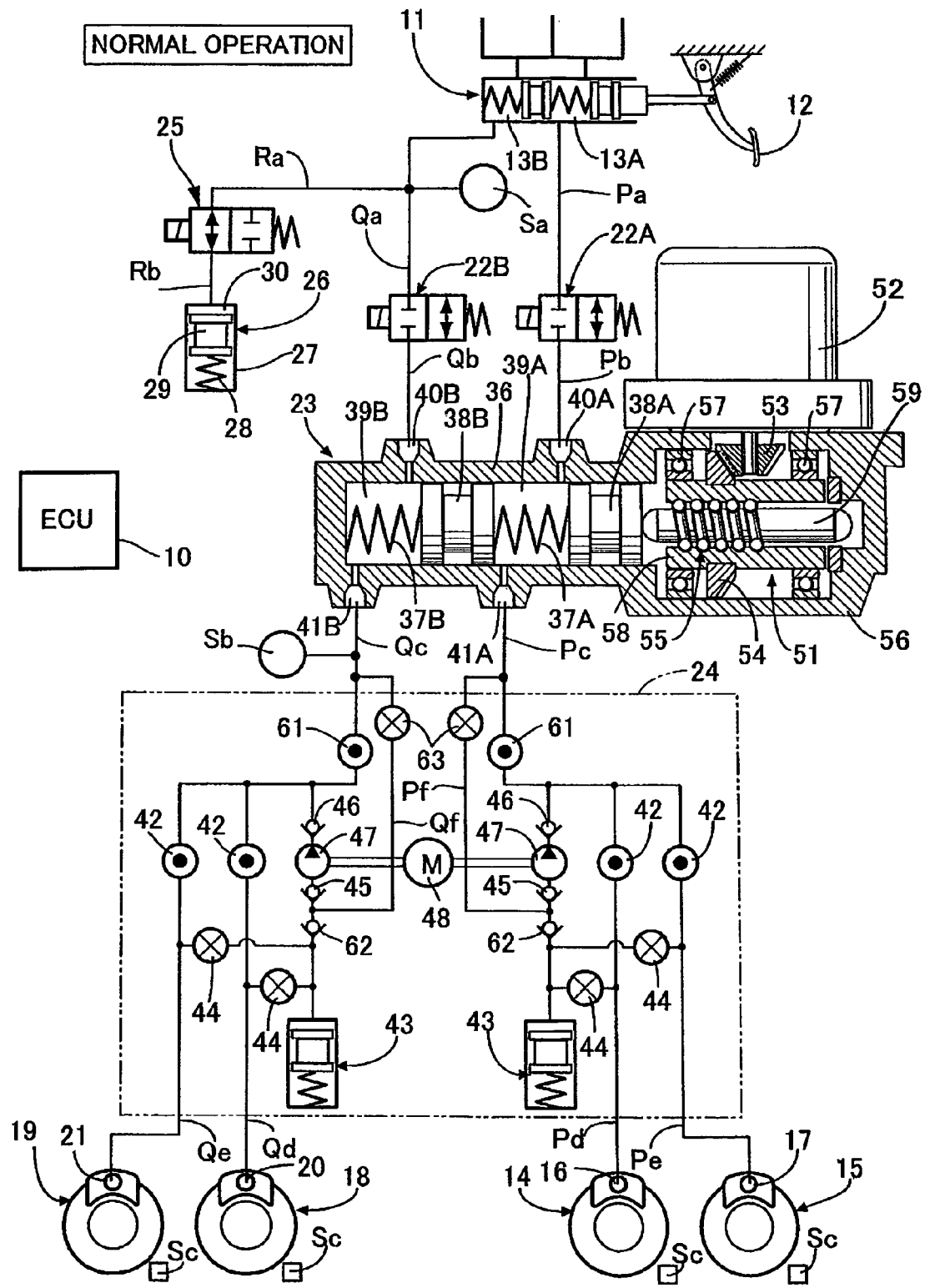

Specifically, as shown in FIG. 5, when the fluid pressure pumps 47, 47 are operated in a state where the suction valves 63, 63 are magnetized to be opened, the fluid pressure pumps 47, 47 suck the brake fluid from the reservoirs of the master cylinder 11 through the suction valves 63, 63, thereby generating brake fluid pressure on a side upstream of the in-valves 42. This brake fluid pressure is regulated to a predetermined level by magnetizing and controlling the regulator valves 61, 61 to a predetermined opening degree.

In this state, the in-valve 42 corresponding to a wheel which requires braking is opened so that the brake fluid pressure is transmitted to the wheel cylinder so as to operate the wheel cylinder to generate a braking force, while closing the in-valve 42 corresponding to a wheel which does not require braking so that the brake fluid pressure is not transmitted to the wheel cylinder. The control of increasing, decreasing and maintaining the brake fluid pressure transmitted to the wheel cylinders is performed by opening and closing the in-valves 42 and the out-valves 44 as in the case of the ABS control.

As described above, only one of the right and left wheels are braked under the VSA control, thereby generating a yaw moment in any direction to improve the operational stability of the vehicle.

As in the first exemplary embodiment, it is necessary to temporarily shut off the communication between the slave cylinder 23 and the wheel cylinders 16, 17, 20 and 21 to prevent a decrease in the brake fluid pressure of the wheel cylinders 16, 17; 20, 21 when a problem occurs with the operation of the slave cylinder 23. Because the second exemplary embodiment does not comprise the fluid pressure retention valves 31A, 31B of the first exemplary embodiment, the regulator valves 61, 61 for performing the VSA function are designed to perform the same function as the fluid pressure retention valves 31A, 31B.

Figure 6:
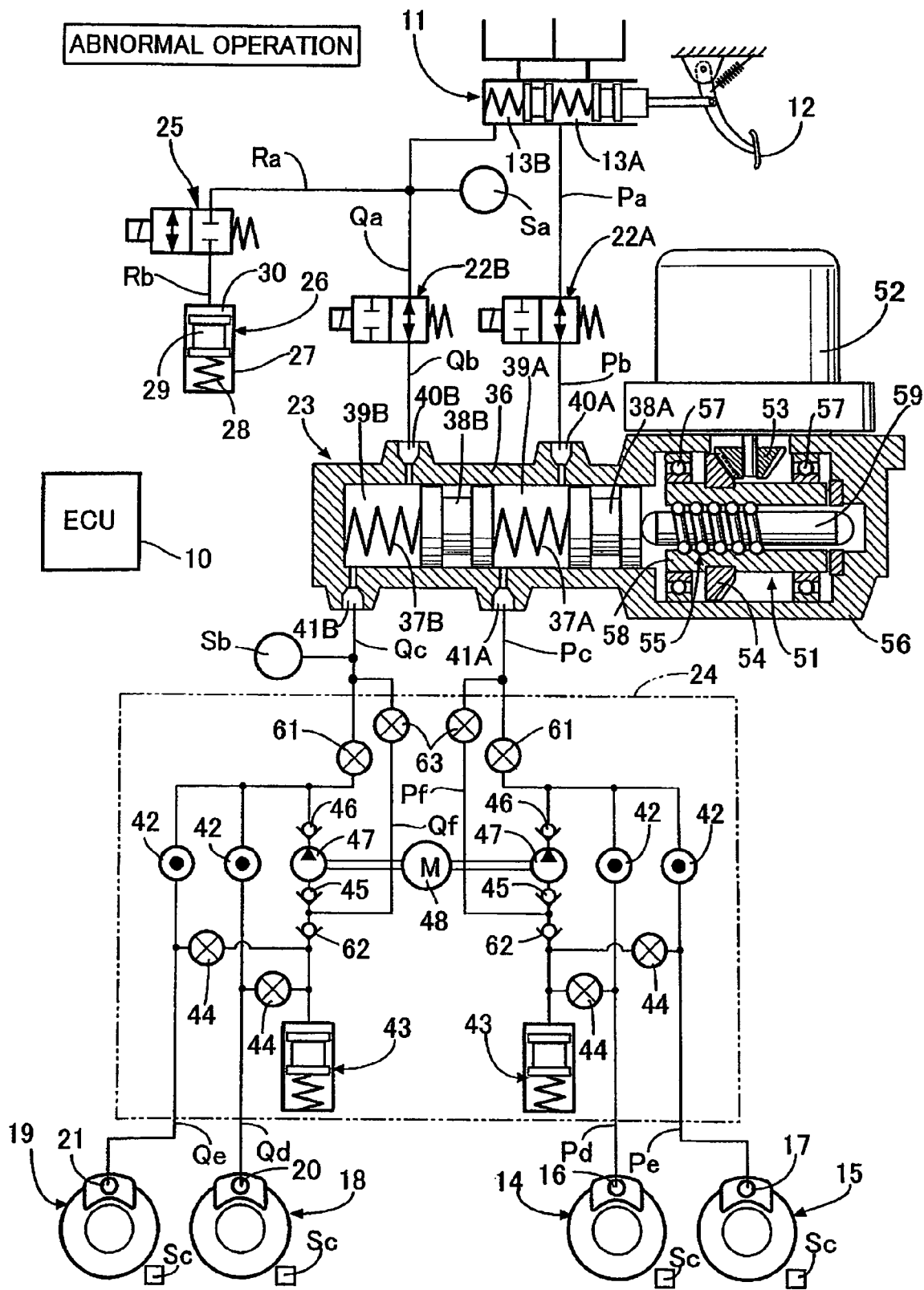

Specifically, when the slave cylinder 23 fails, the communication between the slave cylinder 23 and the wheel cylinders 16, 17; 20, 21 is temporarily shut off by closing the regulator valves 61, 61 in FIG. 6, thereby preventing a decrease in the brake fluid pressure of the wheel cylinders 16, 17; 20, 21. When the predetermined time Tc (see FIG. 4B) has elapsed, the regulator valves 61, 61 are opened again, thereby operating the wheel cylinders 16, 17; 20, 21 by the brake fluid pressure generated by the master cylinder 11. As in the first exemplary embodiment, the stroke simulator 26 is separated from the master cylinder 11 by closing the reaction force permission valve 25 under abnormal operating conditions.

According to the second exemplary embodiment, the regulator valves 61, 61 for performing the VSA function are used instead of the fluid pressure retention valves 31A, 31B. Therefore, it is possible to eliminate the need of the dedicated fluid pressure retention valves 31A, 31B, thereby contributing to a decrease in the number of parts of the overall system.

The exemplary embodiments of the present invention have been described above, but various changes in design may be made without departing from the subject matter of the present invention.

For example, the predetermined time Tc for which the fluid pressure retention valves 31A, 31B or the regulator valves 61, 61 are closed upon failure of the slave cylinder 23 may not be a constant value, and the predetermined time Tc may be variable based on the master cylinder pressure or the wheel cylinder pressure.

What is claimed is:

1. A brake system comprising:
    a master cylinder that generates brake fluid pressure by a braking operation of a driver;
    an electric motor-driven slave cylinder that generates brake fluid pressure according to an electrical signal which is based on the braking operation of the driver;
    a wheel cylinder that brakes a wheel by the brake fluid pressure of the master cylinder or the slave cylinder;
    the brake fluid pressure of the slave cylinder being transmitted to the wheel cylinder when the slave cylinder normally operates, and the brake fluid pressure of the master cylinder being transmitted to the wheel cylinder when the slave cylinder does not operate normally; and
    an opening and closing valve that opens and closes a fluid passage which connects the slave cylinder to the wheel cylinder,
    wherein when a problem occurs with the slave cylinder during braking such that the slave cylinder becomes inoperable, the opening and closing valve is closed for a predetermined time, thereby maintaining the brake fluid pressure applied to the wheel cylinder for said predetermined time.

2. The brake system according to claim 1, wherein the predetermined time is a time period required for the brake fluid pressure generated by the master cylinder to rise to a predetermined value or more.

3. The brake system according to claim 1, further comprising a first fluid pressure sensor for detecting brake fluid pressure generated by the master cylinder, and a second fluid pressure sensor for detecting brake fluid pressure generated by the slave cylinder,
wherein the slave cylinder generates brake fluid pressure so that the brake fluid pressure detected by the second fluid pressure sensor is adjusted to a level corresponding to the brake fluid pressure detected by the first fluid pressure sensor.

4. The brake system according to claim 2, further comprising a first fluid pressure sensor for detecting brake fluid pressure generated by the master cylinder, and a second fluid pressure sensor for detecting brake fluid pressure generated by the slave cylinder,
wherein the slave cylinder generates brake fluid pressure so that the brake fluid pressure detected by the second fluid pressure sensor is adjusted to a level corresponding to the brake fluid pressure detected by the first fluid pressure sensor.

5. The brake system according to claim 1, further comprising a stroke simulator connected to the master cylinder through a reaction force permission valve,
wherein the stroke simulator absorbs the brake fluid pressure generated by the master cylinder by opening the reaction force permission valve during normal operation of the salve cylinder; and the brake fluid pressure generated by the master cylinder is supplied to the wheel cylinder by closing the reaction force permission valve when the slave cylinder does not operate normally.

6. The brake system according to claim 2, further comprising a stroke simulator connected to the master cylinder through a reaction force permission valve,
wherein the stroke simulator absorbs the brake fluid pressure generated by the master cylinder by opening the reaction force permission valve during normal operation of the salve cylinder; and the brake fluid pressure generated by the master cylinder is supplied to the wheel cylinder by closing the reaction force permission valve when the slave cylinder does not operate normally.

7. The brake system according to claim 1, wherein the brake system further comprises an anti-lock braking system which is arranged between the slave cylinder and a plurality of wheel cylinders and which can individually control a braking force generated by each of the wheel cylinders.

8. A brake system comprising:
a controller;
a master cylinder that generates brake fluid pressure by a braking operation of a driver;
an electric motor-driven slave cylinder that generates brake fluid pressure according to an electrical signal which is based on the braking operation of the driver;
a wheel cylinder that brakes a wheel by the brake fluid pressure of the master cylinder or the slave cylinder;
the brake fluid pressure of the slave cylinder being transmitted to the wheel cylinder when the slave cylinder normally operates, and the brake fluid pressure of the master cylinder being transmitted to the wheel cylinder when the slave cylinder does not operate normally; and
an opening and closing valve that opens and closes a fluid passage which connects the slave cylinder to the wheel cylinder,
wherein the controller controls the opening and closing valve such that when a problem occurs with the slave cylinder during braking such that the slave cylinder becomes inoperable, the opening and closing valve is closed for a predetermined time, thereby maintaining the brake fluid pressure applied to the wheel cylinder for said predetermined time.

9. The brake system according to claim 8, wherein the predetermined time is a time period required for the brake fluid pressure generated by the master cylinder to rise to a predetermined value or more.

10. The brake system according to claim 8, further comprising a first fluid pressure sensor for detecting brake fluid pressure generated by the master cylinder, and a second fluid pressure sensor for detecting brake fluid pressure generated by the slave cylinder,
wherein the controller controls the slave cylinder to generate brake fluid pressure so that the brake fluid pressure detected by the second fluid pressure sensor is adjusted to a level corresponding to the brake fluid pressure detected by the first fluid pressure sensor.

11. The brake system according to claim 9, further comprising a first fluid pressure sensor for detecting brake fluid pressure generated by the master cylinder, and a second fluid pressure sensor for detecting brake fluid pressure generated by the slave cylinder,
wherein the controller controls the slave cylinder to generate brake fluid pressure so that the brake fluid pressure detected by the second fluid pressure sensor is adjusted to a level corresponding to the brake fluid pressure detected by the first fluid pressure sensor.

12. The brake system according to claim 8, further comprising a stroke simulator connected to the master cylinder through a reaction force permission valve,
wherein the controller controls the stroke simulator to absorb the brake fluid pressure generated by the master cylinder by opening the reaction force permission valve during normal operation of the salve cylinder, and closes the reaction force permission valve when the slave cylinder does not operate normally so that the brake fluid pressure generated by the master cylinder is supplied to the wheel cylinder.

13. The brake system according to claim 9, further comprising a stroke simulator connected to the master cylinder through a reaction force permission valve,
wherein the controller controls the stroke simulator to absorb the brake fluid pressure generated by the master cylinder by opening the reaction force permission valve during normal operation of the salve cylinder, and closes the reaction force permission valve when the slave cylinder does not operate normally so that the brake fluid pressure generated by the master cylinder is supplied to the wheel cylinder.

14. The brake system according to claim 8, wherein the brake system further comprises an anti-lock braking system which is arranged between the slave cylinder and a plurality of wheel cylinders and which can individually control a braking force generated by each of the wheel cylinders.

15. The brake system according to claim 8, wherein the controller controls the operation of the electric motor.

16. The brake system according to claim 1, wherein after said predetermined time has passed, the opening and closing valve is opened irrespective of a condition of the slave cylinder.

17. The brake system according to claim 8, wherein after said predetermined time has passed, the opening and closing valve is opened irrespective of a condition of the slave cylinder.

18. The brake system of claim 1, further comprising a first pressure sensor disposed proximate the master cylinder for sensing pressure generated by the master cylinder in response to said braking operation, a timer for controlling a duration of closure of said opening and closing valve, and a second pressure sensor for detecting brake fluid pressure generated by the slave cylinder, said second pressure sensor disposed between the slave cylinder and the opening and closing valve.

19. The brake system of claim 8, further comprising a first pressure sensor disposed proximate the master cylinder for sensing pressure generated by the master cylinder in response to said braking operation, a timer for controlling a duration of closure of said opening and closing valve, and a second pressure sensor for detecting brake fluid pressure generated by the slave cylinder, said second pressure sensor disposed between the slave cylinder and the opening and closing valve.

20. The brake system of claim 17, wherein said predetermined time is a time period required for the brake fluid pressure generated by the master cylinder to rise to a predetermined value or more.

* * * * *